(12) United States Patent
Stanfill et al.

(10) Patent No.: US 8,954,482 B2
(45) Date of Patent: Feb. 10, 2015

(54) MANAGING DATA FLOWS IN GRAPH-BASED COMPUTATIONS

(75) Inventors: Craig W. Stanfill, Lincoln, MA (US); Joseph Skeffington Wholey, III, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 636 days.

(21) Appl. No.: 12/234,566

(22) Filed: Sep. 19, 2008

(65) Prior Publication Data

US 2009/0083313 A1    Mar. 26, 2009

Related U.S. Application Data

(60) Provisional application No. 60/973,979, filed on Sep. 20, 2007.

(51) Int. Cl.
| | | |
|---|---|---|
| G06F 12/00 | (2006.01) | |
| G06F 17/30 | (2006.01) | |
| G06F 9/44 | (2006.01) | |
| G06Q 10/06 | (2012.01) | |

(52) U.S. Cl.
CPC .............. *G06F 9/4436* (2013.01); *G06Q 10/06* (2013.01); *G06F 17/30908* (2013.01)
USPC .......................................................... 707/829

(58) Field of Classification Search
USPC .......................................... 707/778, 829, 956
See application file for complete search history.

(56) References Cited

U.S. PATENT DOCUMENTS

| | | | |
|---|---|---|---|
| 5,966,072 A | 10/1999 | Stanfill et al. | |
| 6,654,907 B2 | 11/2003 | Stanfill et al. | |
| 7,164,422 B1 | 1/2007 | Wholey, III et al. | |
| 7,167,850 B2 | 1/2007 | Stanfill | |
| 2004/0168124 A1* | 8/2004 | Beisiegel et al. | ............. 715/513 |
| 2004/0239674 A1* | 12/2004 | Ewald et al. | ................. 345/440 |
| 2005/0114369 A1 | 5/2005 | Gould et al. | |
| 2005/0286512 A1* | 12/2005 | Mahamuni et al. | ........... 370/389 |
| 2006/0095466 A1 | 5/2006 | Stevens et al. | |
| 2007/0192348 A1 | 8/2007 | Brodersen et al. | |
| 2007/0271381 A1 | 11/2007 | Wholey et al. | |
| 2008/0049022 A1 | 2/2008 | Sherb et al. | |
| 2008/0256014 A1 | 10/2008 | Gould et al. | |

FOREIGN PATENT DOCUMENTS

| | | |
|---|---|---|
| JP | 07-013958 | 1/1995 |
| JP | 2004-178084 | 6/2004 |

(Continued)

OTHER PUBLICATIONS

Japanese Office Action, with English Translation, application No. 2010-525993, mailed Jan. 23, 2013, 6 pages.

(Continued)

*Primary Examiner* — Hosain Alam
*Assistant Examiner* — Van Oberly
(74) *Attorney, Agent, or Firm* — Fish & Richardson P.C.

(57) ABSTRACT

Processing data elements associated with a hierarchy that includes multiple levels includes: forming multiple flows of data elements, with each flow being associated with a level of the hierarchy; and including within at least some of the flows hierarchical structure information associated with a level of the hierarchy. For at least one of the levels, two or more and fewer than all of the flows include hierarchical structure information associated with that level.

45 Claims, 11 Drawing Sheets

(56) References Cited

FOREIGN PATENT DOCUMENTS

WO  WO2004034322  4/2004
WO  WO2007002281  1/2007

OTHER PUBLICATIONS

Japanese Office Action, with English translation, Application No. 2010-525993, mailed Jul. 12, 2013, 7 pages.
Cooper, Brian F., et al., "A parallel index for semistructured data," SAC 2002, 8 pages.
Johnston, Theodore, et al., "A Distributed Data-balanced Dictionary Based on the B-link Tree," Parallel Processing Symposium, Mar. 23, 1992, pp. 319-324.
Supplementary European Search Report, Application No. EP08832512, Feb. 20, 2014, 7 pages.

* cited by examiner

MANAGING DATA FLOWS IN GRAPH-BASED COMPUTATIONS

CROSS-REFERENCE TO RELATED APPLICATIONS

This application claims priority to U.S. Application Ser. No. 60/973,979, filed on Sep. 20, 2007.

BACKGROUND

The invention relates to managing data flows in graph-based computations.

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. One approach to executing a graph-based computation is to execute a number of processes, each associated with a different vertex of the graph, and to establish communication paths between the processes according to the links of the graph. For example, the communication paths can use TCP/IP or UNIX domain sockets, or use shared memory to pass data between the processes.

SUMMARY

In one aspect, in general, a method for processing data elements associated with a hierarchy that includes multiple levels includes: forming multiple flows of data elements, with each flow being associated with a level of the hierarchy; and including within at least some of the flows hierarchical structure information associated with a level of the hierarchy. For at least one of the levels, two or more and fewer than all of the flows include hierarchical structure information associated with that level.

Aspects can include one or more of the following features.

The hierarchical structure information includes separation elements that separate adjacent sets of one or more data elements, with each separation element being associated with a level of the hierarchy, wherein, for at least one of the levels, two or more and fewer than all of the flows include separation elements associated with that level.

The method further includes converting between a representation of the data elements within a hierarchical data structure and a representation of the data elements within the multiple flows, based at least in part on the separation elements.

The hierarchical data structure is formatted according to a markup language.

The markup language is XML.

The hierarchical data structure is formatted according to programming language.

The programming language is PL/I, COBOL, or IMS.

Converting between the representations includes converting from the representation of the data elements within the hierarchical data structure to the representation of the data elements within the multiple flows.

Forming multiple flows of data elements includes: extracting a first data element associated with a first level from the hierarchical data structure; extracting one or more data elements associated with a second level nested within a portion of the hierarchical data structure corresponding to the first data element; including at least some of the extracted data elements associated with the second level in a flow associated with the second level; and including the first data element in a flow associated with the first level and a corresponding separation element associated with the first level in the flow associated with the second level.

Forming multiple flows of data elements includes: accepting a stream of multiple hierarchical data structures; and for each hierarchical data structure, extracting data elements from the hierarchical data structure, each data element associated with a corresponding level, and for a given set of one or more child data elements nested within a portion of the hierarchical data structure corresponding to a parent data element, including the set of child data elements and a separation element in a flow associated with the level corresponding to the child data elements, and including the parent data element in a flow associated with the level corresponding to the parent data element.

The included separation element is associated with the level corresponding to the parent data element.

Converting between the representations includes converting from the representation of the data elements within the multiple flows to the representation of the data elements within the hierarchical data structure.

The method further includes: receiving a first data element from a flow associated with a first level; receiving one or more data elements and a separation element associated with the first level from a flow associated with a second level; including the first data element in a portion of the hierarchical data structure; and including at least some of the data elements received from the flow associated with the second level nested within the portion of the hierarchical data structure that includes the first data element.

The method further includes generating a stream of multiple hierarchical data structures, including, for each hierarchical data structure: receiving data elements associated with a given level from a flow associated with the given level; and for each data element received from a flow associated with a first level, including the received data element in a portion of the hierarchical data structure, determining whether there are corresponding sets of one or more data elements associated with other levels based on separation elements within flows associated with the other levels, and including each corresponding set of one or more data elements nested within the portion of the hierarchical data structure that includes the corresponding received data element.

The separation elements within the flows associated with the other levels are associated with the first level.

The hierarchical structure information includes one or more index values included in at least some data elements that uniquely identify at least one data element among multiple data elements of a level of the hierarchy, with each index value being associated with a level of the hierarchy, wherein, for at least one of the levels, two or more and fewer than all of the flows include index values associated with that level.

At least some data elements include an index value that uniquely identifies a parent data element according to the hierarchy.

The method further includes converting between a representation of the data elements within a hierarchical data structure and a representation of the data elements within the multiple flows, based at least in part on the index values.

The hierarchical data structure is formatted according to a markup language.

The markup language is XML.

The hierarchical data structure is formatted according to programming language.

The programming language is PL/I, COBOL, or IMS.

In another aspect, in general a system for processing data elements associated with a hierarchy that includes multiple levels includes means for forming multiple flows of data elements, with each flow being associated with a level of the hierarchy; and means for including within at least some of the flows hierarchical structure information associated with a level of the hierarchy, wherein, for at least one of the levels, two or more and fewer than all of the flows include hierarchical structure information associated with that level.

In another aspect, in general, a computer program, stored on a computer-readable medium, for processing a specification of a graph-based computation, the computer program includes instructions for causing a computer to: form multiple flows of data elements, with each flow being associated with a level of the hierarchy; and include within at least some of the flows hierarchical structure information associated with a level of the hierarchy, wherein, for at least one of the levels, two or more and fewer than all of the flows include hierarchical structure information associated with that level.

Aspects can have one or more of the following advantages.

Including hierarchical structure information in the flows of data elements enables components in a graph-based computation to recognize relationships among data elements in different flows over links connecting the components. Elements of a hierarchical data structure can be extracted from synthetic keys in the data elements or from separation elements, while preserving the relationships, without needing to store a representation of the entire data structure in memory. Synthetic keys can be used to facilitate various operations on the data elements including grouping data elements based on relationships from the hierarchy. For example, the synthetic keys can be used as key fields in a join operation for reconstructing at least some of the hierarchical relationships or rearranging data elements. The arrangement of separation elements in the flows also enables components to reconstruct at least some of the hierarchical relationships from the original data structure. Since some of the hierarchical structure is implicitly represented by the discrete data elements within the flows, selected insertion of separation elements within the flows can in some cases more efficiently represent the structure than synthetic keys inserted into all of the data elements. For example, the separation elements associated with a given level can be included in just the flows of lower levels and do not need to be included in flows of the same or higher levels (where lower levels represent deeper nesting, corresponding to levels of the associated hierarchy that are further from the root). Similarly, to provide efficient representation of the hierarchy using synthetic keys, synthetic keys associated with a given level can be included in just the flows of data elements having a parent at that level and do not need to be included in flows with data elements having a parent at a different level.

Other features and advantages of the invention will become apparent from the following description, and from the claims.

DESCRIPTION

Figure 1A:
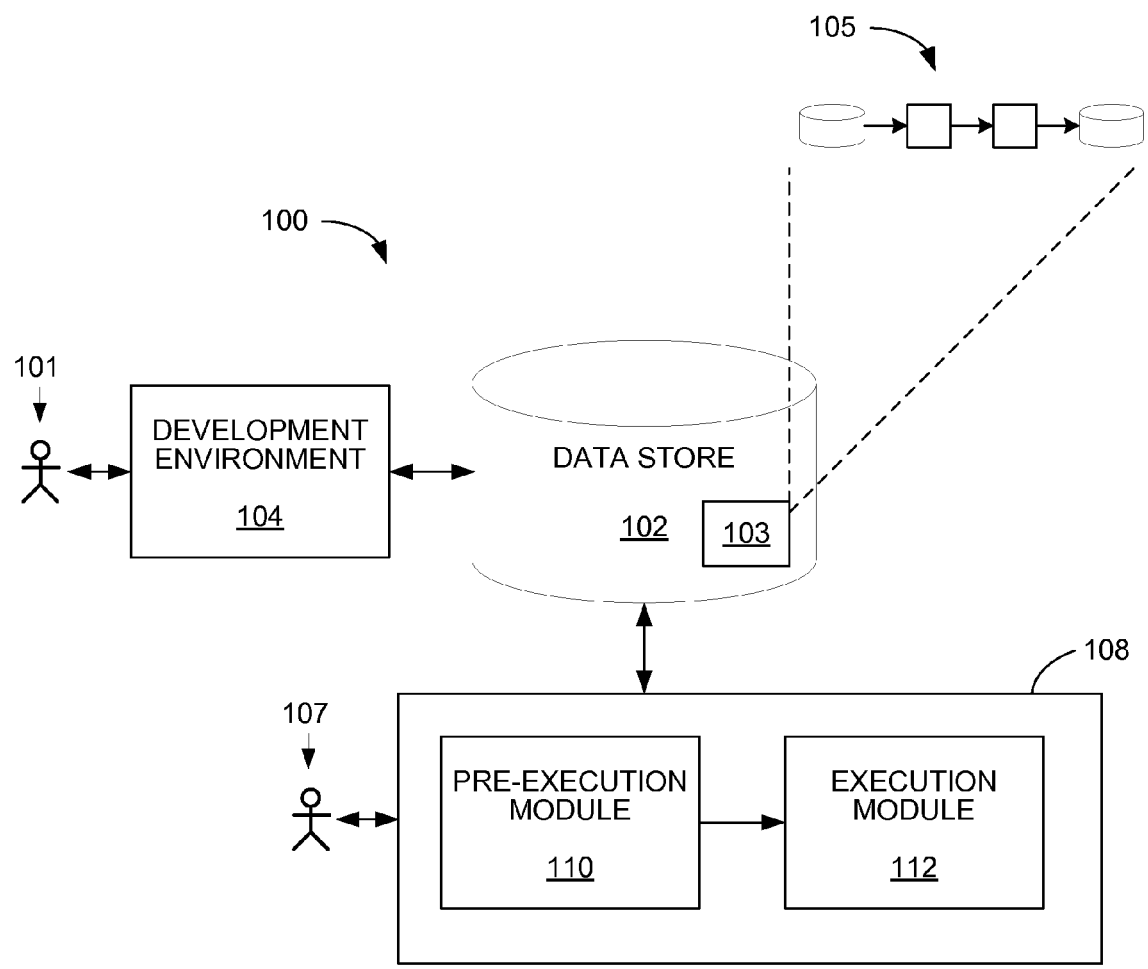
FIG. 1A is a block diagram of a system for executing graph-based computations.

Referring to FIG. 1A, a system 100 for executing graph-based computations includes a development environment 104 coupled to a data store 102 and a runtime environment 108 coupled to the data store 102. A developer 101 builds applications using the development environment 102. An application is associated with one or more computation graphs specified by data structures in the data store 102 which may be written to the data store as a result of the developer's use of the development environment 102. A data structure 103 for a computation graph 105 specifies, for example, the vertices (components or data sets) of a computation graph and links (representing flows of work elements) between the vertices. The data structures can also include various characteristics of the components, data sets, and flows of the computation graphs (also called "dataflow graphs"). A data processing application, for example, may be associated with a computation graph that implements computations performed on data flowing from one or more input data sets, through a graph of processing components, to one or more output data sets.

The runtime environment 108 may be hosted on one or more general-purpose computers under the control of a suitable operating system, such as the UNIX operating system. For example, the runtime environment 108 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. The input, output or intermediate data sets that are accessed by the runtime environment 108 can be a parallel "multifile" stored in a parallel file system (e.g., the data store 102, or in an external data storage coupled to the system 100 locally or remotely over a communication link).

Concurrent execution of multiple components in a graph provides one form of parallelism. Additional parallelism can be achieved by distributing different components of a graph to different computing nodes. Elements of a graph (e.g., data sets, components, and flows) can be explicitly or implicitly replicated to introduce the additional parallelism into the runtime environment 108.

The runtime environment 108 is configured to receive control inputs from stored scripts or input from a user 107 for executing and configuring computations. The control inputs can include commands to process particular data sets using corresponding computation graphs, which are specified in the stored graph data structures. The user 107 can interact with the runtime environment 108, for example, using a command line or graphical interface.

The runtime environment 108 includes a pre-execution module 110 to read the stored graph data structure specifying a given computation graph, and to allocate and configure computing resources such as processes for performing the computations of a component (e.g., a process or thread of execution within the host operating system). The pre-execution module 110 also allocates inter-component communication resources for implementing the links between components (e.g., named pipes or shared memory), and allocates storage space for work elements that arrive at in input port of a component whose process is not yet ready to accept a new work element. The resources for passing work elements over links between components contribute to the processing and storage overhead of the system 100.

The runtime environment 108 includes an execution module 112 to schedule and control execution of the processes assigned to a computation graph by the pre-execution module 110. The execution module 112 can interact with external computing resources coupled to the system 100 such as database engines, data storage, or other modules that are accessed during processing associated with the graph components.

Figure 1B:
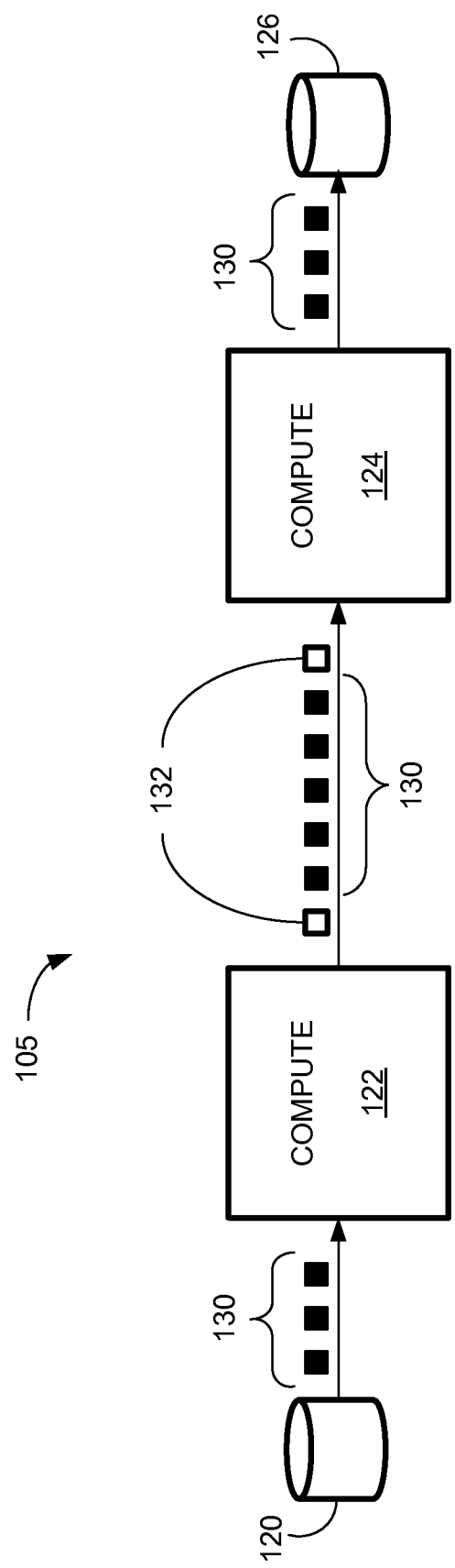
FIG. 1B is a diagram of a computation graph.

Referring to FIG. 1B, a simple example of a computation graph 105 with four linked vertices includes an input data set 120, which is linked to a first component 122, which is linked to a second component 124, which is linked to an output data set 126. The links enable work elements to flow between vertices of the graph 105. Some of the work elements correspond to data elements 130 (such as individual records of a database or values related to one or more records), and some of the work elements correspond to processing elements 132 that don't necessarily represent actual data, but are used to process the data elements. For example, the processing elements 132 can include checkpoint elements, compute point elements, or separation elements. The input data set 120 and output data set 126 may represent, for example, records associated with a database system or transactions associated with a transaction processing system.

In this example, the components 122 and 124 are associated with a portion of the computation defined by the overall computation graph 105, and perform computations based on one or more input data elements received over a link at an input port and provide one or more output data elements over a link from an output port. The output data elements may be, for example, transformed version of an input element, or the output data elements may not necessarily have a direct correspondence to any of the input data elements. Some of the work elements between the components 122 and 124 are processing elements 132. If a processing element 132 received by the component 124 corresponds to a checkpoint element, the component 124 performs a checkpointing procedure to store the state of the computation to enable the graph 105 to recover to that point in the computation in the event of a failure. If a processing element 132 received by the component 124 corresponds to a compute point, the component 124 performs a predetermined operation in the computation such as updating a result based on a series of data elements received since the last compute point (e.g., as described in more detail in U.S. Pat. No. 6,654,907 entitled "Continuous flow compute point based data processing," incorporated herein by reference). The compute points can provide a form of synchronization among the components in a graph by marking locations within different flows that correspond to related parts of a given computation.

Separation elements enable synchronization and also enable components to recognize relationships among data elements in different flows. For example, a separation element can be used within a flow of work elements to separate groups of data elements that are associated with different parts of structured data such as data having a hierarchical or nested structure. An example of a hierarchical data structure is a file or portion of a file that includes text formatted according to a markup language such as the Extensible Markup Language (XML). In an XML document, pairs of opening and closing tags can be nested within each other. The levels in the hierarchy correspond to the depth of nesting of the tags in the document. Another example of data having a nested structure is a nested list of arguments for nested iterative loops within a computation. Hierarchical data also may be formatted according to hierarchical data structures, such as those in programming languages like PL/I or COBOL, or in hierarchical databases like IBM Information Management System (IMS).

In some cases, data in an input data set may be hierarchical and the components may need to receive not just the data values within the data structure (e.g., as data elements within a flow), but also at least some of the relationships among the data values. These relationships can be indicated by including hierarchical structure information (e.g., separation elements or synthetic keys) within the flow. A hierarchical data structure from the input data set can be received by a component that extracts the data values from the data structure and generates one or more output flows that include the hierarchical structure information. For example, the data elements can be separated by separation elements in an arrangement that enables other downstream components to determine at least some of the hierarchical relationships from the original data structure. Alternatively, the data elements can include surrogate keys that enable other downstream components to determine at least some of the hierarchical relationships from the original data structure. An example of such a component (called a "normalize component") is described in more detail below. In some cases, data elements may need to be arranged into a hierarchical data structure that is to be stored in an output data set. A component can determine how different data elements received from one or more flows are to be arranged based at least in part on the separation elements within the flows, and can generate the appropriate data structure for the output data set. An example of such a component (called a "denormalize component") is described in more detail below.

Some hierarchical data structures, such as XML documents, can be processed using parsers that provide an interface for accessing the elements within the data structure. For XML documents, two examples of different approaches for parsers are the Document Object Model (DOM) specification developed by the World Wide Web Consortium (W3C), and SAX (Simple API for XML) developed for Java and subsequently other programming languages. Both approaches are based on the syntax of a "well-formed" XML document, which includes a pair of root opening and closing tags whose content may include an arbitrary number of XML elements in a nested structure that represents a hierarchy. The format of an XML element is as follows:

<tag_name attribute_name="value" . . . > . . . </tag_name>

The element is delimited by opening and closing tags that have a name ("tag_name" in this example) and optionally any number of attributes defined in the opening tag. Each attribute has a name ("attribute_name" in this example) and a value within quotes. The content between any pair of opening and closing tags may include other XML elements nested within that pair of opening and closing tags. Based on the nesting of tags, each XML document corresponds to a hierarchy that can be represented by a tree with a "root node" corresponding to the root tags and some structure of child nodes connected to respective parent nodes corresponding to the nesting of XML element tags within other tags.

Figure 1C:
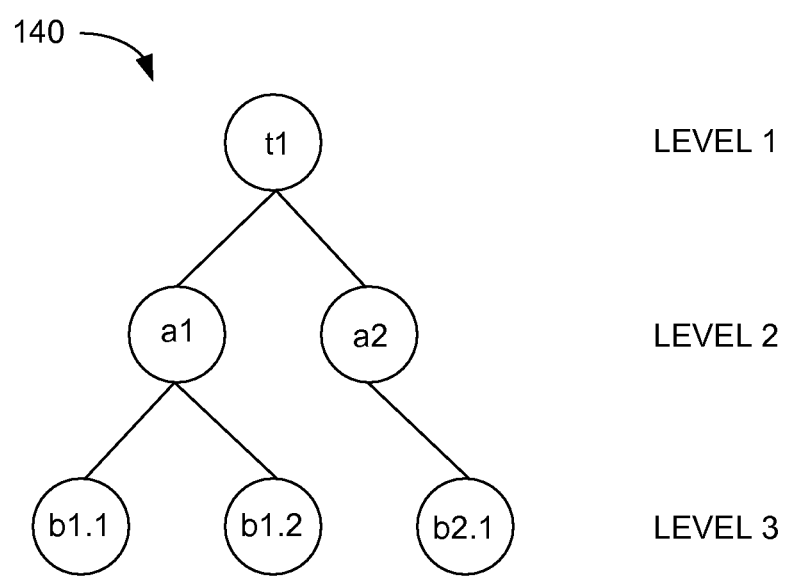
FIG. 1C is a diagram of a tree representing a hierarchy of a nested document.

For example, the tree structure 140 shown in FIG. 1C represents the "hierarchy" resulting from the nested tags in the XML document below. The tree structure 140 has a single node at level 1 (the root level), and child nodes that span a depth of three levels (where each level corresponds to a different distance from the root node, and a different depth of nesting of the tags). Each node is labeled by the corresponding attribute value.

```
<top x="t1">
    <a y="a1">
        <b z="b1.1"></b>
        <b z="b1.2"></b>
    </a>
    <a y="a2">
        <b z="b2.1"></b>
    </a>
</top>
```

The SAX and DOM approaches have different advantages. In the DOM approach to parsing an XML document, the parser generates a tree data structure with parent child relationships between nodes based on the nested tags of the XML document. Since a DOM parser stores this tree data structure in memory before processing of the elements begins, the amount of memory available may limit the size of the XML document that can be efficiently processed. In the SAX approach to parsing an XML document, the parser sequentially traverses the XML document and generates function calls to an application as elements of the document are recognized based on the tags. Those function calls can process the elements as the document is traversed without needing to store a representation of the entire XML document in memory. Thus, a SAX parser typically has smaller memory requirements (e.g., based on the maximum depth of the XML tree) than for a DOM parser (e.g., based on entire number of nodes in the XML tree). While a SAX parser can be faster, especially for larger documents, a DOM parser can enable more flexible processing to be performed using the pre-determined tree data structure instead of needing to keep track of the structural relationships as the document is being processed.

Figure 2:
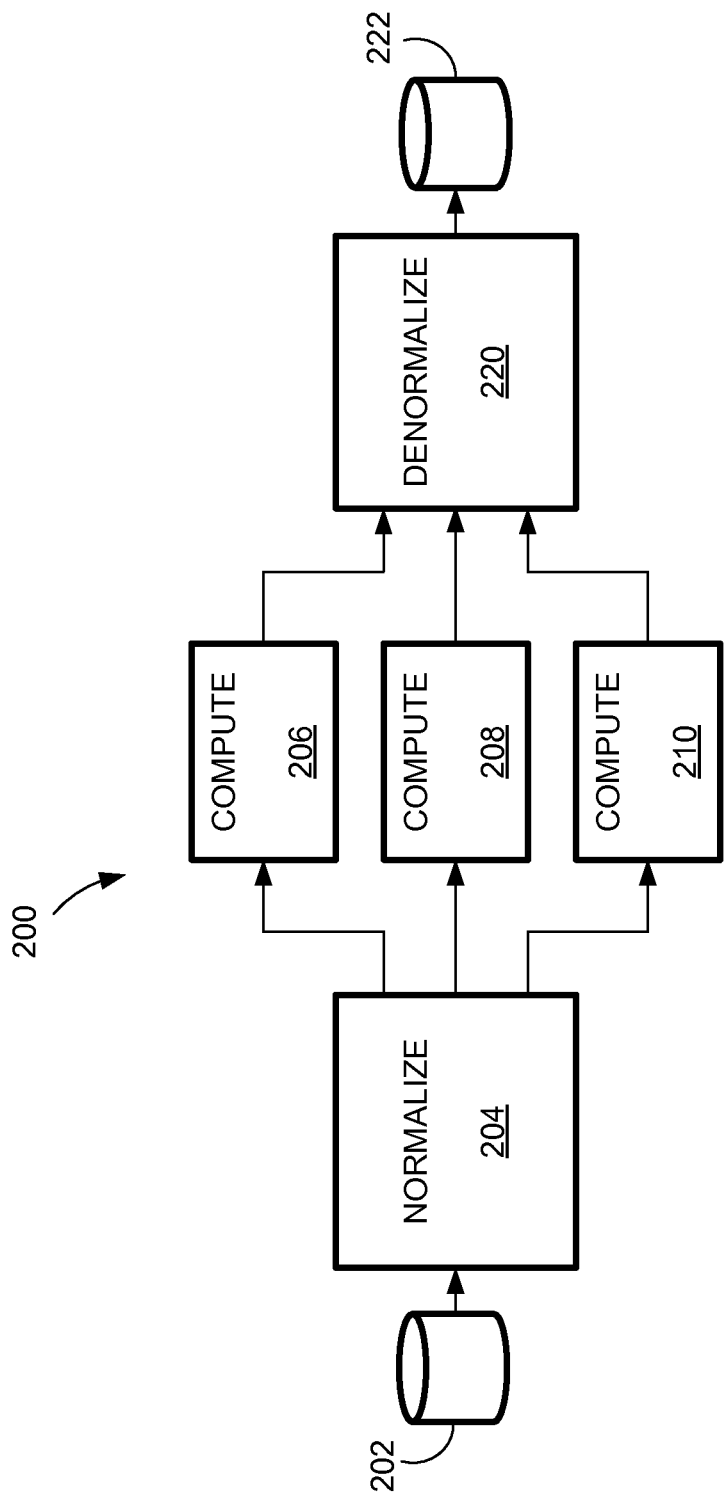
FIGS. 2, 3A and 4A are diagrams of computation graphs.

FIG. 2 shows an example of a computation graph 200 for processing hierarchical data structures, such as XML documents. In the examples below, for simplicity of the description XML document structure will be used, but these techniques can also be applied to other types of hierarchical or nested data. An input data set 202 provides an XML document or a stream of multiple XML documents. A normalize component 204 extracts data elements (e.g., attributes, tag names, and/or content of a tagged XML element) from the XML document and for a given output port provides a flow of data elements over a link from a specified level of the hierarchical structure of the document. The flow can include all data elements at the specified level, or a subset of data elements at the specified level (e.g., all elements at that level having a given tag and/or having a parent with a given tag).

The normalize component 204 can be configured to operate according to any of multiple processing modes. In a "separation element processing mode" the normalize component 204 determines which data elements are to be sent over a given output port and inserts separation elements at appropriate locations according to the hierarchical structure, as described in more detail below. In a "synthetic key processing mode" the normalize component 204 determines which data elements are to be sent over a given output port and augments each data element with a synthetic key (also called a surrogate key) to indicate its position within the nested hierarchical structure (e.g., identifying the "parent" data element), as described in more detail below. The synthetic key can be used later in a join operation to reconstruct some or all of the original nested hierarchical structure of the XML document. Both modes share some of the advantages of a SAX parser by processing an XML document from the input data set 202 sequentially without needing to store a copy of the entire document structure in memory.

The separation element processing mode has some further advantages in some cases. In the separation element processing mode it is not necessary to augment the data elements with any synthetic key values or other information for reconstructing the XML document which provides more efficient memory storage requirements for the data elements while they are being processed by the compute components 206, 208, and 210 of the graph 200. The separation elements can also provide some of the advantages of a DOM parser by providing part or all of the tree structure of the XML document within some number of flows (e.g., as many flows as the depth of the tree).

In the example shown in FIG. 2, an input XML document may have a simple structure of three different tags that are nested to correspond to three different levels of a hierarchical structure. The normalize component 204 provides data elements having one of the three different tags to each of three compute components 206, 208, and 210. The three compute components may make potential modifications of the received data elements such as transforming some of the attributes and/or content of the data elements, renaming tags, or inserting or deleting data elements. Processed data elements flow to a denormalize component 220, which constructs an output XML document for storage in an output data set 222. In the separation element processing mode, the compute components can process the data elements while preserving the arrangements of separation elements among the data elements within the respective flows. The denormalize component 220 can use the separation elements to construct an XML document having the processed data elements in the appropriate nested arrangement of tags that corresponds to the hierarchical structure of the original XML document. In other examples, if significant changes are to be made to the structure of the XML document, the graph may include various additional components that may, for example, change the arrangement of separation elements, or perform operations to change the level of different flows (removing or inserting separation elements as appropriate), or combine multiple flows, or split a flow to multiple flows.

Figure 3A:
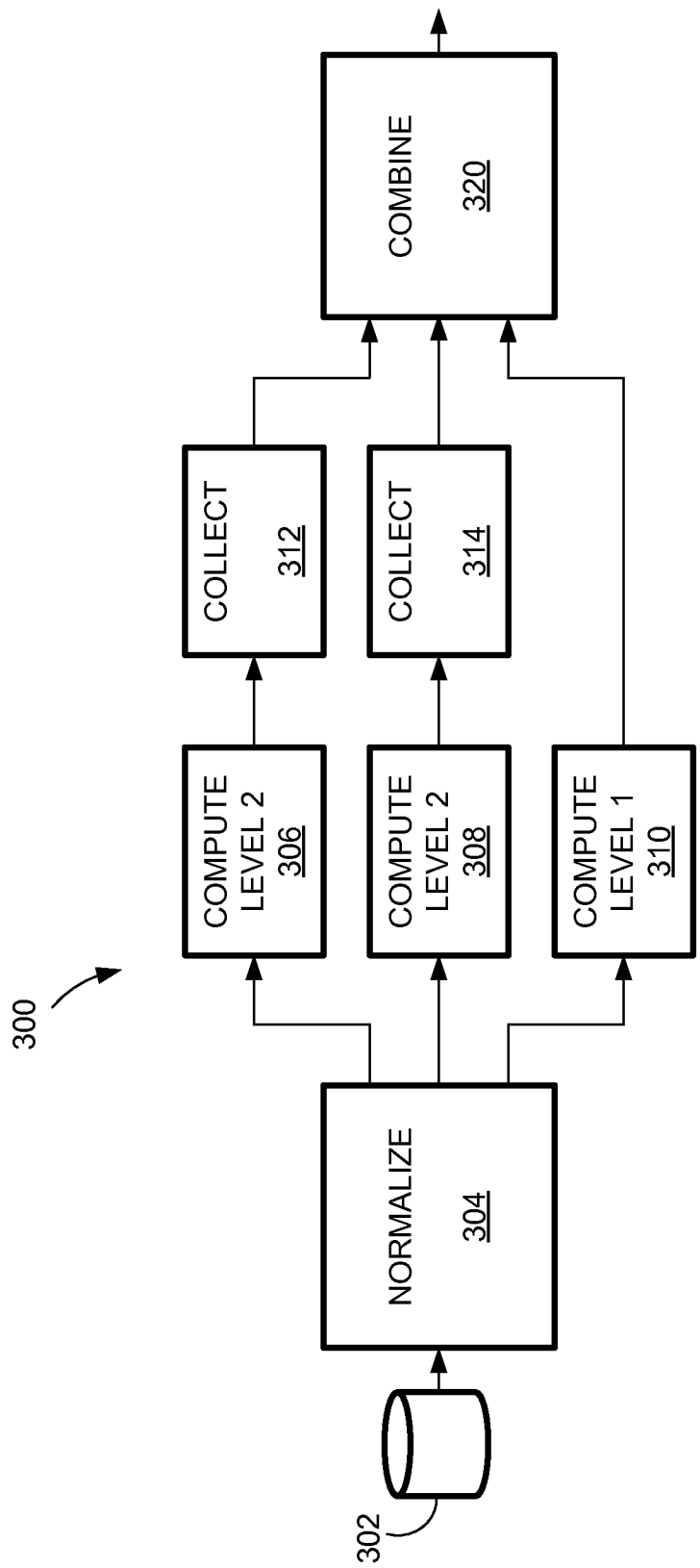

FIG. 3A shows a portion of a graph 300 for processing a series of XML documents that each have a top (root) level "level 1," and a lower level "level 2" that has elements tagged with one of two possible tags. The following series of two XML documents are an example of a portion of the stream of documents provided by an input data set 302.

```
<top x="t1">
    <a y="a1.1"></a>
    <b z="b1.1"></b>
    <a y="a1.2"></a>
</top>
<top x="t2">
    <a y="a2.1"></a>
    <b z="b2.1"></b>
    <b z="a2.2"></b>
</top>
```

Figure 3B:
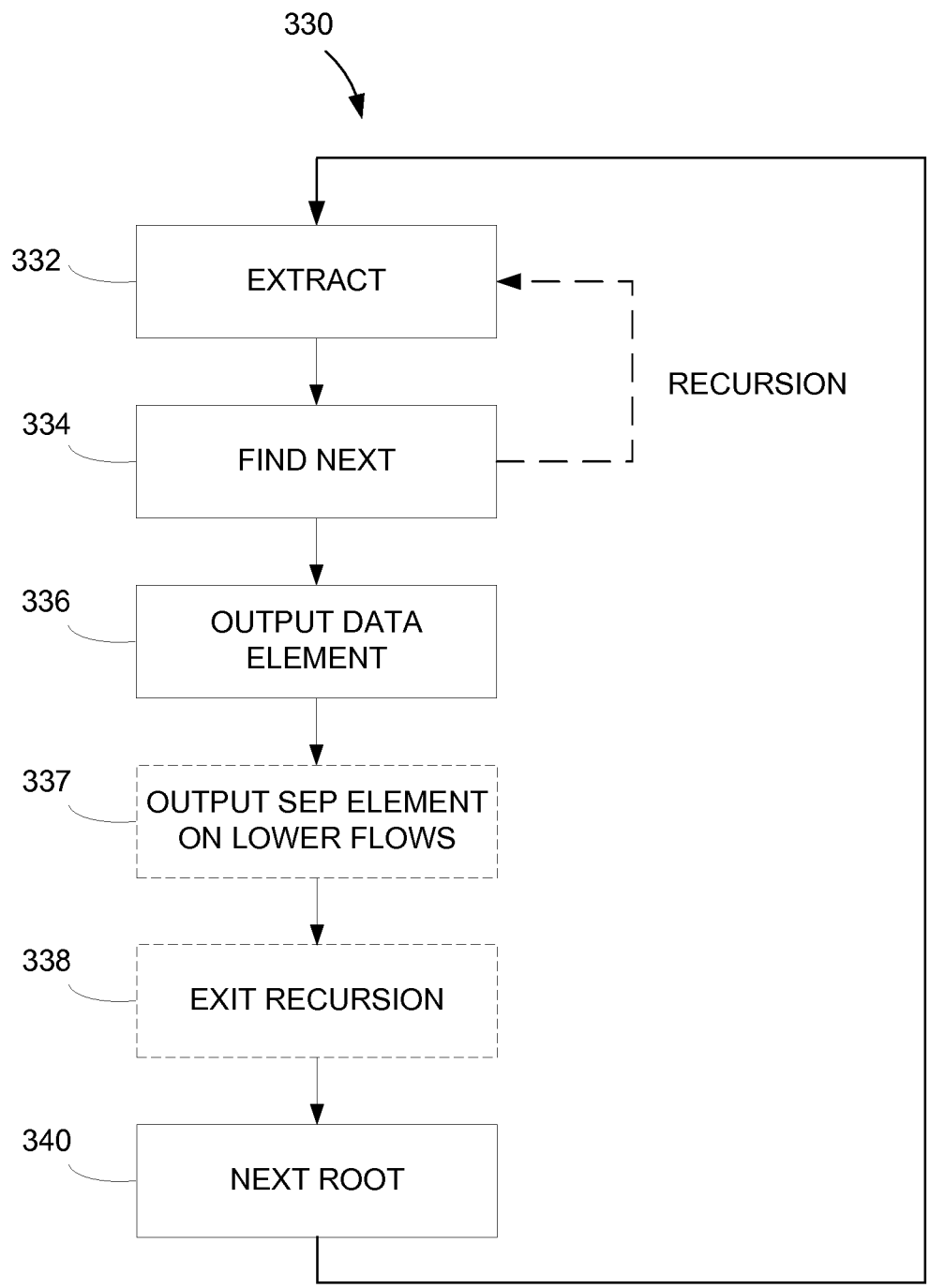
FIG. 3B is a flowchart of a procedure for processing data.

FIG. 3B shows a flowchart for an exemplary procedure 330 used by a normalize component 304 for processing the XML documents in the separation element processing mode to provide flows of data elements with the attribute values from the documents separated by the appropriate separation elements that enable the hierarchical structure of the XML documents to be preserved. The procedure 330 is expressed here as a recursive procedure that starts with the "extract" step 332 whenever the opening tag of a new XML element is encountered. This procedure 330 is first applied to an encountered root XML element (in this example, having the "top" tag associated with "level 1"). The component 304 extracts (332) and temporarily stores attributes and any non-tag contents of the encountered XML element in an appropriate format for a data element of a corresponding flow. The component 304 finds (334) the next item in the document, which may be a new opening tag or a closing tag. If a new opening tag is found nested within the encountered XML element, the component 304 recursively applies the procedure 330. If a closing tag is found, the component 304 proceeds to output (336) the saved data element associated with a given level of the closing tag in a flow associated with the given level. The component 304 also outputs (337) a separation element in each of the other flows associated with a lower level than the given level (if any exist). In some cases, the separation elements include an indication of the given level of the closing tag so that different separation elements in a flow that were inserted based on closing tags at different levels can be distinguished. The component 304 then either exits the recursion (338) if any open procedure calls remain, or proceeds to encounter the next opening root tag (340).

Figure 3C:
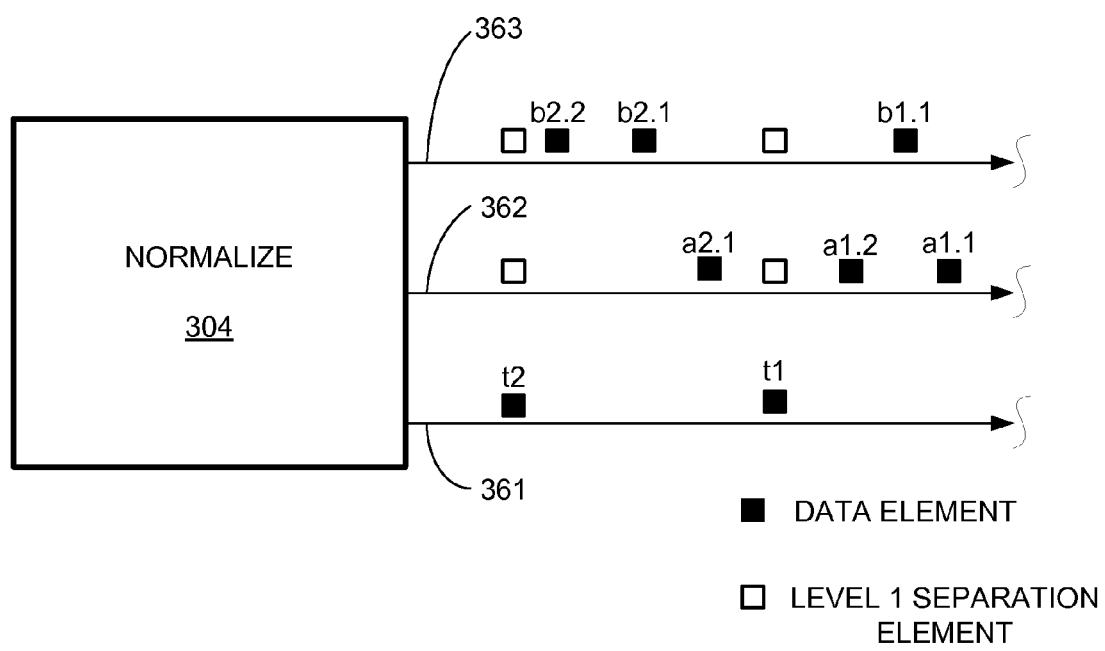
FIGS. 3C, 4B, 4C and 4D are diagrams of flows from a normalization component.

FIG. 3C shows the results of the procedure 330 applied to the two XML documents above. A flow 361 associated with level 1 provides data elements with the attribute values from the top level XML elements having the "top" tag. A flow 362 associated with level 2 provides data elements with the attribute values from XML elements having the "a" tag. A flow 363 also associated with level 2 provides data elements with the attribute values from XML elements having the "b" tag. In this example, the normalize component 304 inserts a level 1 separation element into each of the flows 262 and 263 for each closing top level tag. Since the closing tags for "a" and "b" are associated with the lowest level flows (level 2 in this case) no separation elements are output for those closing tags.

The graph 300 (FIG. 3A) includes compute components 306, 308, and 310 configured to process the respective flows of work elements recognizing the separation elements as an indication of which data elements were nested within tags of a higher level data element. The compute components 306 and 308 that process flows at level 2 feed an output flow to respective collect components 312 and 314. The collect components 312 and 314 process the level 2 flows to remove the separation elements and collect corresponding data elements to provide level 1 flows. A combine component 320 is then able to process all three flows to combine them for subsequent processing in the rest of the graph 300.

Figure 4A:
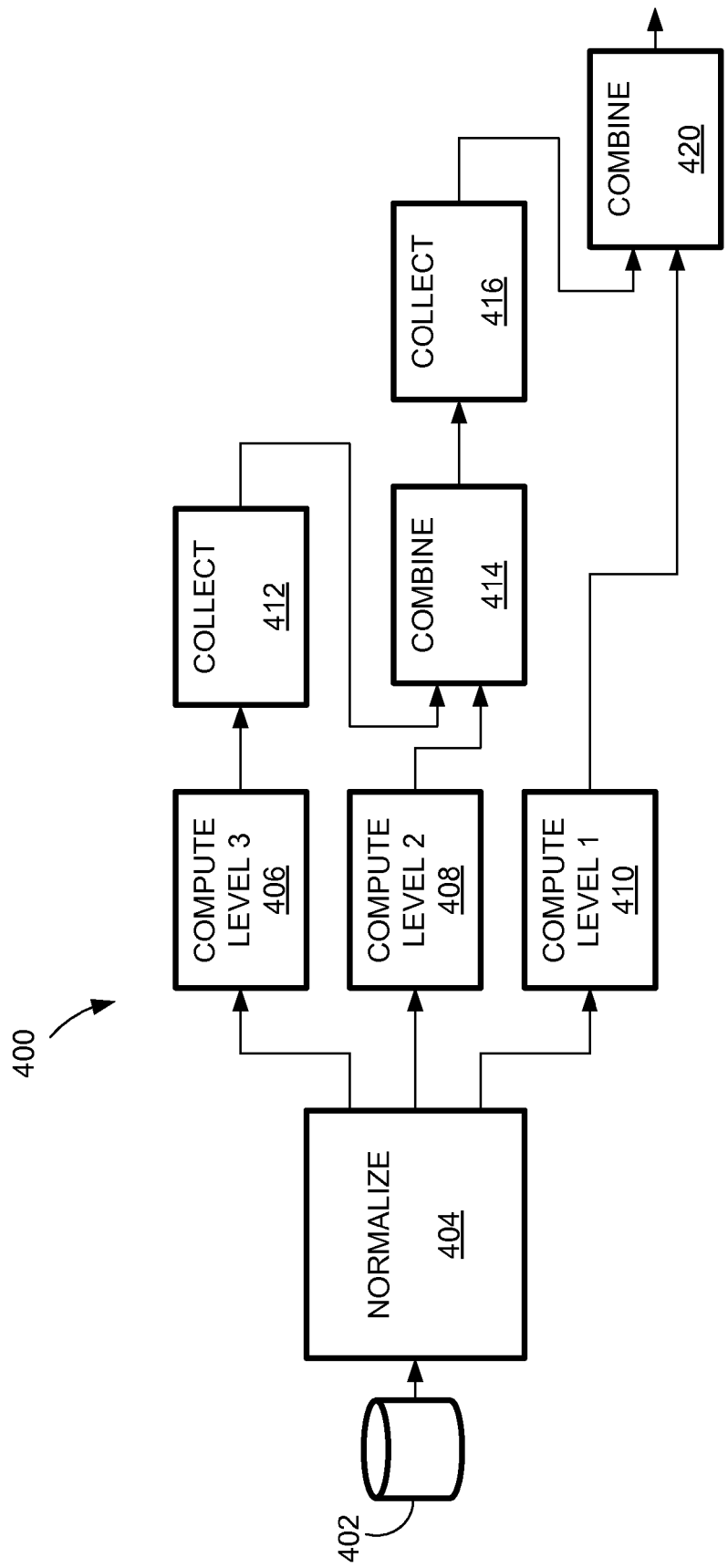

FIG. 4A shows a portion of a graph 400 for processing a series of XML documents that each have a top (root) level "level 1," a second level "level 2," and a third level "level 3." The following series of two XML documents are an example of a portion of the stream of documents provided by an input data set 402.

```
<top x="t1">
    <a y="a1.1">
        <b z="b1.1.1"></b>
        <b z="b1.1.2"></b>
    </a>
    <a y="a1.2">
        <b z="b1.2.1"></b>
    </a>
</top>
<top x="t2">
    <a y="a2.1">
        <b z="b2.1.1"></b>
    </a>
</top>
```

Figure 4B:
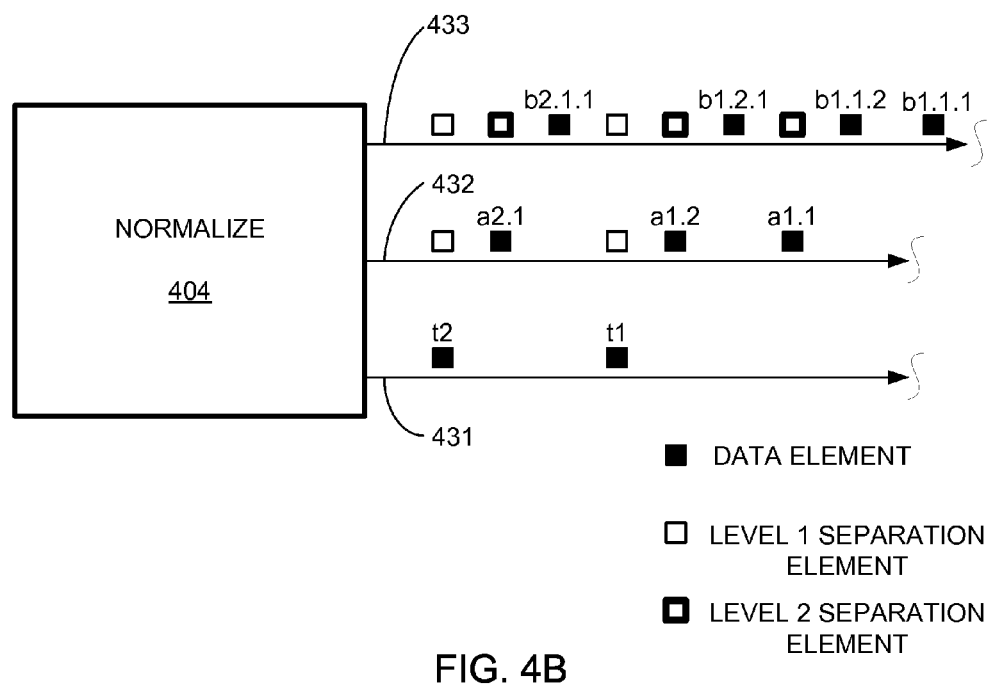

FIG. 4B shows the results of the procedure 330 applied to the two XML documents above. A flow 431 associated with level 1 provides data elements with the attribute values from the top level XML elements having the "top" tag. A flow 432 associated with level 2 provides data elements with the attribute values from the XML elements having the "a" tag. A flow 433 associated with level 3 provides data elements with the attribute values from the XML elements having the "b" tag. In this example, a normalize component 404 inserts a level 1 separation element into each of the flows 432 and 433 for each closing top level tag, and inserts a level 2 separation element into the flow 433 for each closing "b" tag. Since the closing tags for "b" are associated with the lowest level flow (level 3 in this case) no separation elements are output for those closing tags.

Referring again to FIG. 4A, three compute components 406, 408, and 410 process the flows 433, 432, and 431, respectively. A collect component 412 processes the level 3 flow 431 to remove the level 2 separation elements and collect corresponding data elements to provide a level 2 flow. A combine component 414 is then able to process the resulting level 2 flow along with the level 2 flow from compute component 408 to provide the combined flows to a collect component 416. The collect component 416 removes the level 1 separation elements and provides a level 1 flow that is then combined with the level 1 flow from the compute component 410 in the combine component 420.

A procedure that can be used by a denormalize component to process one or more received flows to provide an XML document (or other hierarchical data structure) can reverse the actions performed by the normalize component. The denormalize component can match the separation elements in a flow to a corresponding data element in another flow to determine how to nest XML elements. For example, if one or more data elements are followed by a separation element of level L, the denormalize component can find the corresponding level L data element in a different flow, and the one or more data elements can be nested within an XML element corresponding to the level L data element.

The synthetic key processing mode also has some advantages in some cases. Separation elements are not needed in synthetic key processing mode. A given data element includes a synthetic key that uniquely identifies at least the parent data element of the given data element. For example, the record structure of a data element can include an extra field to store a synthetic key value. While identifying just the parent data element in each child data element is sufficient to reconstruct the relationships in the hierarchical structure, the synthetic key can optionally identify any number of ancestors in the hierarchy.

The synthetic key processing mode also provides some advantages of a SAX parser by processing an XML document from the input data set 202 sequentially without needing to store a copy of the entire document structure in memory. The synthetic keys can also provide some of the advantages of a DOM parser by providing part or all of the tree structure of the XML document within some number of flows (e.g., as many flows as the depth of the tree).

The synthetic keys can be sequential (e.g., numerical) values. In some implementations, synthetic key values can be allocated to data elements as sequential index values that increment as each new data element is processed by a normalize component. For example, the normalize component can maintain a global counter to allocate index values. Each node in the hierarchy would be associated with a unique index value. Alternatively, in some implementations, it may not be necessary for all synthetic keys to be unique in order to uniquely identify a parent node. If the level of each data element is known, then synthetic key values can be unique for a given level of the hierarchy, but may repeat at different levels. For example, a counter can be maintained for each level and index values can be allocated to data elements of a given level using the counter for that level. As long as the data elements for a given level have unique index values, the parent data element can be uniquely identified by a combination of the known parent level and the index value.

The following initial portion of an XML document is an example of a document provided by an input data set 402 to be processed in the synthetic key processing mode. The document has a top (root) level with a "top" tag, a second level with tags "Head" and "Body," and third, fourth and fifth levels with tags that depend on the tags of the respective parent data elements.

```
<top>
    <Head>
        <Eye color="green" side="left"></Eye>
        <Eye color="green" side="right"></Eye>
        <Nose color="red"></Nose>
        <Mouth state="open">Pizza</Mouth>
    </Head>
    <Body>
        <Arm side="left">
            <Hand state="open">
                <Finger name="thumb"></Finger>
                <Finger name="index"></Finger>
                <Finger name="middle"></Finger>
                <Finger name="ring"></Finger>
                <Finger name="pinky"></Finger>
            </Hand>
        </Arm>
        <Arm side="right">
            <Hand state="fist">
                <Finger name="thumb"></Finger>
                <Finger name="index"></Finger>
                <Finger name="middle"></Finger>
                <Finger name="ring"></Finger>
                <Finger name="pinky"></Finger>
            </Hand>
        </Arm>
        ...
    </Body>
</top>
```

Figure 4C:
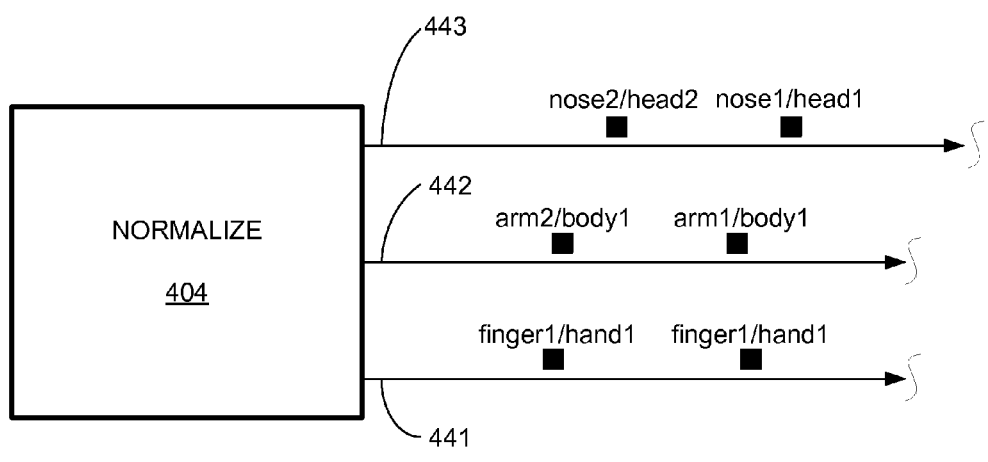

Referring to FIG. 4C, in this example, the normalize component 404 provides three different series of data elements on the flows 441, 442, and 443. The flow 441 includes data elements with the "Nose" tag. The flow 442 includes data elements with the "Arm" tag. The flow 443 includes data elements with the "Finger" tag. No separation elements are needed in this example. Each data element is assigned an index value that is unique at least among other data elements at the same level. The index values can be used to reconstruct where each data element belongs in the hierarchy of a document from the input data set 402 because each data element includes the index value of its parent data element (except for the root level data element, which does not have a parent data element). The index values can also be read and used by subsequent components receiving the data flows to join or lookup data between flows, for example.

Figure 4D:
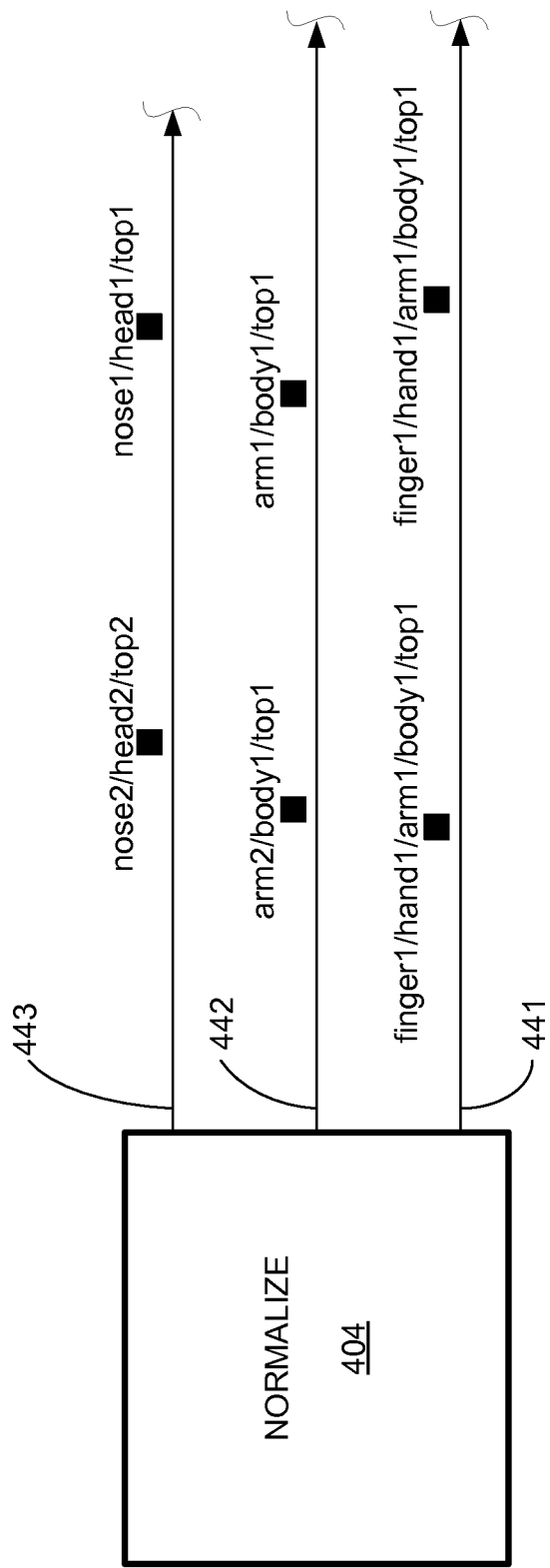

In one example, the record structure of a given data element includes a field for the index value assigned to the data element itself, and a field for the index value assigned to the parent data element. In FIG. 4C, each data element is labeled with its own index value and its parent's index value: "[own]/[parent]". Data elements on flow 441 include an index value uniquely identifying the parent "Head" data element of a given "Nose" data element. Data elements on flow 442 include an index value uniquely identifying the parent "Body" data element of a given "Arm" data element. Data elements on flow 443 include an index value uniquely identifying the parent "Hand" data element of a given "Finger" data element. In another example, the record structure of a given data element includes a field for the index value assigned to the data element itself, and fields for the index values assigned to the ancestor data elements up to the root level. In FIG. 4D, each data element is labeled with its own index value and its ancestor's index values: "[own]/[parent]/ . . . /[root]". In both examples of FIG. 4C and FIG. 4D, the parent index of each data element is sufficient to reconstruct the position in the hierarchy of that data element without needing to include that same index in all of the flows. This leads to an efficient representation of the hierarchy within the flows that does not grow as the breadth of the hierarchy grows. In the example of FIG. 4C the size of the index fields for each data element is constant with the size of the hierarchy. In the example of FIG. 4D the size of the index fields for each data element grows with the depth of the hierarchy, but not the breadth.

The normalize component 404 provides the ability to select any number of descendent data elements to be embedded within each data element output on a flow. In some cases, only the data (e.g., attribute values) associated with a given node is output as a data element. In some cases, a data element itself includes a hierarchical structure that enables the data element to include a complete or partial sub-tree of descendent nodes from the original hierarchy of the document. For example, for the document above, a data element corresponding to the level of the "Arm" tag can also include data for any of the enclosed descendent nodes corresponding to "Hand" and "Finger" tags. Since the data element itself has a hierarchical structure, the embedded data from descendent nodes do not need to be assigned synthetic keys.

In addition to index fields identifying a parent or other ancestor nodes, a data element can optionally include data from a parent or other ancestor nodes. For example, for the document above, a data element corresponding to the level of the "Finger" tag may include not only a finger "name" attribute (e.g., name="pinky"), but also a hand "state" attribute (e.g., state="first") and an arm "side" attribute (e.g., side="right"). In some cases, including information from ancestor nodes can eliminate the need to perform certain join operations.

Figure 4E:
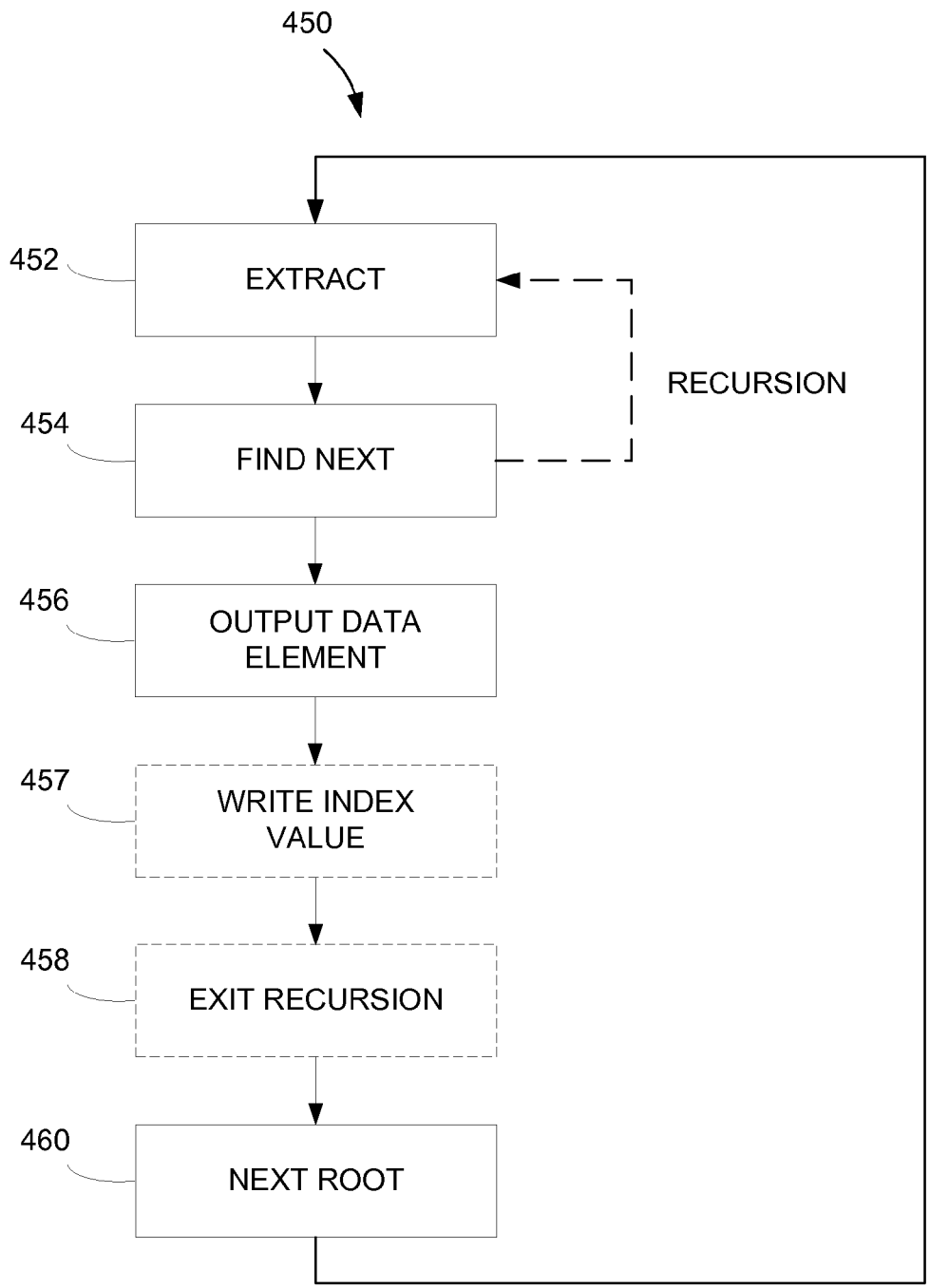
FIG. 4E is a flowchart of a procedure for processing data.

FIG. 4E shows a flowchart for an exemplary procedure 450 used by the normalize component 404 for processing the XML documents in the synthetic key processing mode to provide flows of data elements with the attribute values from the documents and appropriate synthetic keys that enable the hierarchical structure of the XML documents to be preserved. The procedure 450 is expressed here as a recursive procedure that starts with the "extract" step 452 whenever the opening tag of a new XML element is encountered. This procedure 450 is first applied to an encountered root XML element (in this example, having the "top" tag associated with "level 1"). The component 404 extracts (452) and temporarily stores attributes and any non-tag contents of the encountered XML element in an appropriate format for a data element of a corresponding flow. The component 404 finds (454) the next item in the document, which may be a new opening tag or a closing tag. If a new opening tag is found nested within the encountered XML element, the component 454 recursively applies the procedure 500. If a closing tag is found, the component 404 proceeds to output (456) the saved data element associated with a given level of the closing tag in a flow associated with the given level. The component 404 also writes (457) an index value in the data element identifying the parent data element (if any exists). The component 404 then either exits the recursion (458) if any open procedure calls remain, or proceeds to encounter the next opening root tag (460).

A procedure that can be used by a denormalize component to process one or more received flows to provide an XML document (or other hierarchical data structure) can reverse the actions performed by the normalize component. The denormalize component can match the synthetic key values in a flow to corresponding synthetic key values in another flow to determine how to nest XML elements.

The dataflow management approach described herein can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium such as a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for processing data elements associated with a hierarchy that includes multiple levels, the method including:
   forming multiple flows, each flow including multiple data elements, with each flow being associated with a specific level of the hierarchy, in which the hierarchy corresponds to a hierarchical data structure formatted according to at least one of a markup language or a programming language, the forming including:
   including, within at least some of the flows, both data elements and one or more structure elements representative of hierarchical structure information associated with a level of the hierarchy, wherein two or more and fewer than all of the flows each includes at least one structure element associated with a common level of the hierarchy; and
   processing data elements included in the multiple flows using multiple compute components in which each compute component processes data elements associated with a specific level of the hierarchy, at least a first compute component processes data elements associated with a first level of the hierarchy, at least a second compute component processes data elements associated with a second level of the hierarchy, and the first level is different from the second level.

2. The method of claim 1, wherein the structure elements include separation elements that separate adjacent sets of one or more data elements within a flow, with each separation element being associated with a level of the hierarchy wherein two or more and fewer than all of the flows each includes at least one separation element associated with a common level of the hierarchy.

3. The method of claim 1, further including converting between a representation of the data elements within a hierarchical data structure and a representation of the data elements within the multiple flows, based at least in part on the separation elements.

4. The method of claim 3, wherein converting between the representations includes converting from the representation of the data elements within the hierarchical data structure to the representation of the data elements within the multiple flows.

5. The method of claim 4, wherein forming multiple flows of data elements includes:
   extracting a first data element associated with a first level from the hierarchical data structure;
   extracting one or more data elements associated with a second level nested within a portion of the hierarchical data structure corresponding to the first data element;
   including at least some of the extracted data elements associated with the second level in a flow associated with the second level; and
   including the first data element in a flow associated with the first level and a corresponding separation element associated with the first level in the flow associated with the second level.

6. The method of claim 4, wherein forming multiple flows of data elements includes:
   accepting a stream of multiple hierarchical data structures; and
   for each hierarchical data structure,
      extracting data elements from the hierarchical data structure, each data element associated with a corresponding level, and
      for a given set of one or more child data elements nested within a portion of the hierarchical data structure corresponding to a parent data element, including the set of child data elements and a separation element in a flow associated with the level corresponding to the child data elements, and including the parent data element in a flow associated with the level corresponding to the parent data element.

7. The method of claim 3, wherein converting between the representations includes converting from the representation of the data elements within the multiple flows to the representation of the data elements within the hierarchical data structure.

8. The method of claim 7, further including:
receiving a first data element from a flow associated with a first level;
receiving one or more data elements and a separation element associated with the first level from a flow associated with a second level;
including the first data element in a portion of the hierarchical data structure; and
including at least some of the data elements received from the flow associated with the second level nested within the portion of the hierarchical data structure that includes the first data element.

9. The method of claim 7, further including generating a stream of multiple hierarchical data structures, including, for each hierarchical data structure:
receiving data elements associated with a given level from a flow associated with the given level; and
for each data element received from a flow associated with a first level,
including the received data element in a portion of the hierarchical data structure,
determining whether there are corresponding sets of one or more data elements associated with other levels based on separation elements within flows associated with the other levels, and
including each corresponding set of one or more data elements nested within the portion of the hierarchical data structure that includes the corresponding received data element.

10. The method of claim 1, wherein the hierarchical structure information includes one or more index values included in at least some data elements that uniquely identify at least one data element among multiple data elements of a level of the hierarchy, with each index value being associated with a level of the hierarchy, wherein, for at least one of the levels, two or more and fewer than all of the flows include index values associated with that level.

11. The method of claim 1, wherein at least one of the flows includes a series of one or more data elements and one or more structure elements.

12. The method of claim 1 in which at least a third compute component also processes some of the data elements associated with the second level of the hierarchy.

13. A system for processing data elements associated with a hierarchy that includes multiple levels, the system including:
means for forming multiple flows, each flow including multiple data elements, with each flow being associated with a specific level of the hierarchy, in which the hierarchy corresponds to a hierarchical data structure formatted according to at least one of a markup language or a programming language, the forming including:
including, within at least some of the flows, both data elements and one or more structure elements representative of hierarchical structure information associated with a level of the hierarchy, wherein two or more and fewer than all of the flows each includes at least one structure element associated with a common level of the hierarchy; and
means for processing data elements included in the multiple flows using multiple compute components in which each compute component processes data elements associated with a specific level of the hierarchy, at least a first compute component processes data elements associated with a first level of the hierarchy, at least a second compute component processes data elements associated with a second level of the hierarchy, and the first level is different from the second level.

14. The system of claim 13, wherein the structure elements include separation elements that separate adjacent sets of one or more data elements within a flow, with each separation element being associated with a level of the hierarchy, wherein two or more and fewer than all of the flows each include at least one separation element associated with a common level of the hierarchy.

15. The system of claim 13, wherein at least one of the flows includes a series of one or more data elements and one or more structure elements.

16. A non-transitory computer-readable storage medium storing a computer program, for processing data elements associated with a hierarchy that includes multiple levels, the computer program including instructions for causing a computer to:
form multiple flows, each flow including multiple data elements, with each flow being associated with a specific level of the hierarchy, in which the hierarchy corresponds to a hierarchical data structure formatted according to at least one of a markup language or a programming language, including:
including, within at least some of the flows, both data elements and one or more structure elements representative of hierarchical structure information associated with a level of the hierarchy, wherein two or more and fewer than all of the flows each includes at least one structure element associated with a common level of the hierarchy; and
process data elements included in the multiple flows using multiple compute components in which each compute component processes data elements associated with a specific level of the hierarchy, at least a first compute component processes data elements associated with a first level of the hierarchy, at least a second compute component processes data elements associated with a second level of the hierarchy, and the first level is different from the second level.

17. The computer-readable storage medium of claim 16, wherein the structure elements include separation elements that separate adjacent sets of one or more data elements within a flow, with each separation element being associated with a level of the hierarchy, wherein two or more and fewer than all of the flows each include at least one separation element associated with a common level of the hierarchy.

18. The computer-readable storage medium of claim 17, wherein the computer program further includes instructions for causing a computer to convert between a representation of the data elements within the hierarchical data structure and a representation of the data elements within the multiple flows, based at least in part on the separation elements.

19. The computer-readable storage medium of claim 18, wherein converting between the representations includes converting from the representation of the data elements within the hierarchical data structure to the representation of the data elements within the multiple flows.

20. The computer-readable storage medium of claim 19, wherein the instructions for causing a computer to form multiple flows of data elements include instructions for causing the computer to:
extract a first data element associated with a first level from the hierarchical data structure;

extract one or more data elements associated with a second level nested within a portion of the hierarchical data structure corresponding to the first data element;

include at least some of the extracted data elements associated with the second level in a flow associated with the second level; and include the first data element in a flow associated with the first level and a corresponding separation element associated with the first level in the flow associated with the second level.

21. The computer-readable storage medium of claim 19, wherein the instructions for causing a computer to form multiple flows of data elements include instructions for causing the computer to:

accept a stream of multiple hierarchical data structures; and for each hierarchical data structure, extract data elements from the hierarchical data structure, each data element associated with a corresponding level, and for a given set of one or more child data elements nested within a portion of the hierarchical data structure corresponding to a parent data element, include the set of child data elements and a separation element in a flow associated with the level corresponding to the child data elements, and including the parent data element in a flow associated with the level corresponding to the parent data element.

22. The computer-readable storage medium of claim 19, wherein the instructions for causing a computer to convert between the representations include instructions for causing a computer to convert from the representation of the data elements within the multiple flows to the representation of the data elements within the hierarchical data structure.

23. The computer-readable storage medium of claim 22, further including instructions for causing a computer to:

receive a first data element from a flow associated with a first level;

receive one or more data elements and a separation element associated with the first level from a flow associated with a second level;

include the first data element in a portion of the hierarchical data structure; and include at least some of the data elements received from the flow associated with the second level nested within the portion of the hierarchical data structure that includes the first data element.

24. The computer-readable storage medium of claim 22, further including instructions for causing a computer to generate a stream of multiple hierarchical data structures, including, for each hierarchical data structure:

receiving data elements associated with a given level from a flow associated with the given level; and for each data element received from a flow associated with a first level, including the received data element in a portion of the hierarchical data structure, determining whether there are corresponding sets of one or more data elements associated with other levels based on separation elements within flows associated with the other levels, and including each corresponding set of one or more data elements nested within the portion of the hierarchical data structure that includes the corresponding received data element.

25. The computer-readable storage medium of claim 16, wherein the hierarchical structure information includes one or more index values included in at least some data elements that uniquely identify at least one data element among multiple data elements of a level of the hierarchy, with each index value being associated with a level of the hierarchy, wherein, for at least one of the levels, two or more and fewer than all of the flows include index values associated with that level.

26. The computer-readable storage medium of claim 16, wherein at least one of the flows includes a series of one or more data elements and one or more structure elements.

27. A computing system for processing data elements associated with a hierarchy that includes multiple levels, the system including:

a processor configured to:

form multiple flows, each flow including multiple data elements, with each flow being associated with a specific level of the hierarchy, in which the hierarchy corresponds to a hierarchical data structure formatted according to at least one of a markup language or a programming language, including:

include, within at least some of the flows, both data elements and one or more structure elements representative of hierarchical structure information associated with a level of the hierarchy, wherein two or more and fewer than all of the flows each includes at least one structure element associated with a common level of the hierarchy; and process data elements included in the multiple flows using multiple compute components in which each compute component processes data elements associated with a specific level of the hierarchy, at least a first compute component processes data elements associated with a first level of the hierarchy, at least a second compute component processes data elements associated with a second level of the hierarchy, and the first level is different from the second level.

28. The computing system of claim 27, wherein the structure elements include separation elements that separate adjacent sets of one or more data elements within a flow, with each separation element being associated with a level of the hierarchy, wherein two or more and fewer than all of the flows each include at least one separation element associated with a common level of the hierarchy.

29. The computing system of claim of claim 28, wherein the processor is further configured to convert between a representation of the data elements within the hierarchical data structure and a representation of the data elements within the multiple flows, based at least in part on the separation elements.

30. The computing system of claim 29, wherein converting between the representations includes converting from the representation of the data elements within the hierarchical data structure to the representation of the data elements within the multiple flows.

31. The computing system of claim 30, wherein forming multiple flows of data elements includes:

extracting a first data element associated with a first level from the hierarchical data structure;

extracting one or more data elements associated with a second level nested within a portion of the hierarchical data structure corresponding to the first data element;

including at least some of the extracted data elements associated with the second level in a flow associated with the second level; and including the first data element in a flow associated with the first level and a corresponding separation element associated with the first level in the flow associated with the second level.

32. The computing system of claim 30, wherein forming multiple flows of data elements includes:
  accepting a stream of multiple hierarchical data structures; and
  for each hierarchical data structure,
    extracting data elements from the hierarchical data structure, each data element associated with a corresponding level, and
    for a given set of one or more child data elements nested within a portion of the hierarchical data structure corresponding to a parent data element, including the set of child data elements and a separation element in a flow associated with the level corresponding to the child data elements, and including the parent data element in a flow associated with the level corresponding to the parent data element.

33. The computing system of claim 29, wherein converting between the representations includes converting from the representation of the data elements within the multiple flows to the representation of the data elements within the hierarchical data structure.

34. The computing system of claim 33, wherein the processor is further configured to:
  receive a first data element from a flow associated with a first level;
  receive one or more data elements and a separation element associated with the first level from a flow associated with a second level;
  include the first data element in a portion of the hierarchical data structure; and
  include at least some of the data elements received from the flow associated with the second level nested within the portion of the hierarchical data structure that includes the first data element.

35. The computing system of claim 33, wherein the processor is further configured to generate a stream of multiple hierarchical data structures, including, for each hierarchical data structure:
  receiving data elements associated with a given level from a flow associated with the given level; and
  for each data element received from a flow associated with a first level,
    including the received data element in a portion of the hierarchical data structure,
    determining whether there are corresponding sets of one or more data elements associated with other levels based on separation elements within flows associated with the other levels, and
    including each corresponding set of one or more data elements nested within the portion of the hierarchical data structure that includes the corresponding received data element.

36. The computing system of claim 27, wherein the hierarchical structure information includes one or more index values included in at least some data elements that uniquely identify at least one data element among multiple data elements of a level of the hierarchy, with each index value being associated with a level of the hierarchy, wherein, for at least one of the levels, two or more and fewer than all of the flows include index values associated with that level.

37. The computing system of claim 27, wherein at least one of the flows includes a series of one or more data elements and one or more structure elements.

38. A method including:
  receiving data elements associated with a hierarchy that includes multiple levels in which the data elements include data elements of a hierarchical data structure formatted according to at least one of a markup language or a programming language;
  separating the data elements according to the hierarchy levels associated with the data elements to form multiple flows of data elements, in which each flow includes data elements associated with a specific hierarchy level, and for at least some of the flows, each flow includes both data elements and one or more structure elements representative of hierarchical structure information associated with a level of the hierarchy; and
  processing the data elements in the flows using multiple compute components, including:
    processing, using a first compute component, data elements in a first flow that is associated with a first level of the hierarchy, and
    processing, using a second compute component, data elements in a second flow that is associated with a second level of the hierarchy, the second level being different from the first level.

39. The method of claim 38 in which the structure elements include separation elements that separate adjacent sets of one or more data elements within a flow, with each separation element being associated with a level of the hierarchy.

40. The method of claim 38 in which two or more and fewer than all of the flows each includes at least one structure element associated with a common level of the hierarchy.

41. The method of claim 38, including converting from a representation of processed data elements within the multiple flows to a representation of the processed data elements within the hierarchical data structure based on the structure elements.

42. A method including:
  receiving a stream of hierarchical data structures, for at least some of the hierarchical data structures, each hierarchical data structure includes data elements associated with a hierarchy that includes multiple levels, in which the hierarchical data structures are formatted according to at least one of a markup language or a programming language;
  converting a representation of the data elements within the hierarchical data structures to a representation of the data elements within multiple flows in which the data elements in the hierarchical data structures are included in the flows according to the hierarchy levels associated with the data elements, each flow including data elements associated with a specific hierarchy level, and for at least some of the flows, each flow includes both data elements and one or more structure elements representative of hierarchical structure information associated with a level of the hierarchy; and
  processing the data elements in the flows using multiple, compute components, including:
    processing, using a first compute component, data elements in a first flow associated with a first level of the hierarchy, and
    processing, using a second compute component, data elements in a second flow associated with a second level of the hierarchy, the second level being different from the first level.

43. The method of claim 42, comprising:
  including data elements that are in each hierarchical data structure and associated with a first level of the hierarchy in the first flow,
  including data elements that are in each hierarchical data structure and associated with a second level of the hierarchy in the second flow.

44. The method of claim 42 in which each of at least some of the hierarchical data structures includes at least a first data element associated with the first level of the hierarchy, and a second data element and a third data element both associated with the second level of the hierarchy, and processing the data elements includes:
  using the first compute component to process the first data element of each hierarchical structure,
  using the second compute component to process the second data element of each hierarchical structure, and
  using a third compute component to process the third data element of each hierarchical structure.

45. The method of claim 42, including converting a representation of processed data elements within the multiple flows to a representation of the processed data elements within the hierarchical data structures based on the structure elements.

* * * * *

UNITED STATES PATENT AND TRADEMARK OFFICE
CERTIFICATE OF CORRECTION

PATENT NO.        : 8,954,482 B2                                              Page 1 of 1
APPLICATION NO.   : 12/234566
DATED             : February 10, 2015
INVENTOR(S)       : Craig W. Stanfill and Joseph Skeffington Wholey, III It is certified that error appears in the above-identified patent and that said Letters Patent is hereby corrected as shown below:

In the claims

Col. 17, Line 29, claim 22, delete "claim 19," and insert -- claim 18, --

Col. 18, Line 43, claim 29, delete "of claim of claim" and insert -- of claim --

Col. 20, Line 52, claim 42, delete "multiple," and insert -- multiple --

Signed and Sealed this
Twenty-eighth Day of July, 2015

Michelle K. Lee
*Director of the United States Patent and Trademark Office*